United States Patent [19]

Komatsubara et al.

[11] Patent Number: 4,609,164
[45] Date of Patent: Sep. 2, 1986

[54] CASSETTE TAPE MACHINE

[75] Inventors: Masahiro Komatsubara; Tetsuro Kamimura; Takugi Inanaga; Akira Takahashi, all of Saitama, Japan

[73] Assignee: Pioneer Electronic Corporation, Tokyo, Japan

[21] Appl. No.: 659,853

[22] Filed: Oct. 10, 1984

Related U.S. Application Data

[63] Continuation of Ser. No. 355,424, Dec. 29, 1981, abandoned.

[30] Foreign Application Priority Data

Dec. 29, 1980 [JP] Japan ............................ 55-187923[U]
Dec. 29, 1980 [JP] Japan ............................ 55-187924[U]
Dec. 29, 1980 [JP] Japan ............................ 55-187925[U]

[51] Int. Cl.$^4$ ............................................. G11B 15/32
[52] U.S. Cl. ..................................... 242/199; 242/68.3

[56] References Cited

U.S. PATENT DOCUMENTS

| 3,383,067 | 5/1968 | Uritis | 242/68.3 |
| 3,791,604 | 2/1974 | Meermans | 242/68.3 |
| 4,148,444 | 4/1979 | Hehner | 242/68.2 |
| 4,309,002 | 1/1982 | Saitou | 242/198 |

FOREIGN PATENT DOCUMENTS

| 1022025 | 1/1958 | Fed. Rep. of Germany | 242/71.8 |
| 2359902 | 11/1973 | Fed. Rep. of Germany | 242/68.3 |
| 2557743 | 6/1977 | Fed. Rep. of Germany | 242/200 |
| 1436976 | 5/1976 | United Kingdom | 242/199 |

Primary Examiner—John M. Jillions
Attorney, Agent, or Firm—Sughrue, Mion, Zinn, Macpeak & Seas

[57] ABSTRACT

A support is provided on a shaft member immediately below reel-engaging projections to resiliently support the reel with a force such that a fully wound reel is supported substantially at an intermediate portion of the cassette case.

13 Claims, 39 Drawing Figures

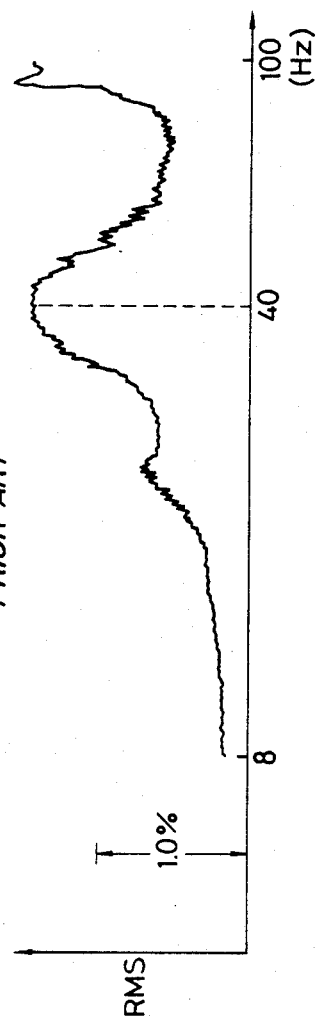
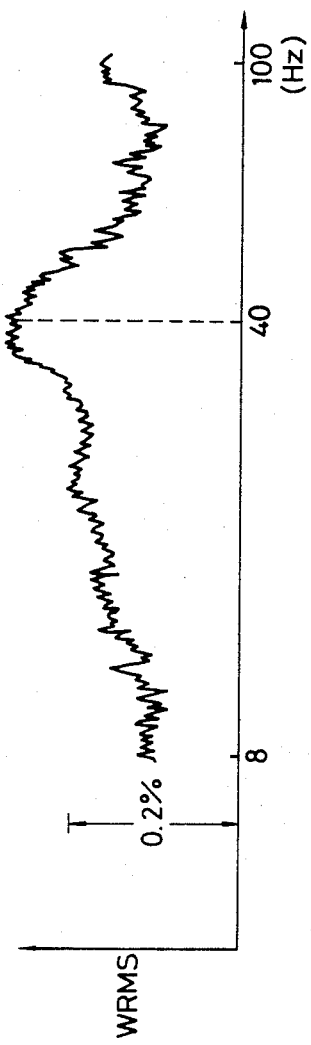

CASSETTE TAPE MACHINE

This is a continuation of application Ser. No. 355,424, filed Dec. 29, 1981, now abandoned.

BACKGROUND OF THE INVENTION

The present invention relates to a cassette tape recorder for automatic stereo sets.

It is well known from experience that an ordinary cassette tape recorder may produce a high quality sound when a vehicle in which the cassette tape recorder is installed is in a stationary condition but that the same tape recorder may produce a poor quality sound when the vehicle is in motion and is experiencing large up-and-down vibrations. It is also known that, particularly when the remainder of tape to be played is large, wow is increased to thereby result in a poor quality sound production.

Various studies of this wow phenomenon have been made by the present inventors. In one experiment, and up-and-down vibration of 1 G was applied to an ordinary cassette tape recorder at a changing frequency, and the resulting wow was measured. The results are shown in FIG. 1, which is a graph showing the wow (RMS) characteristics vs. frequency. As is apparent from the characteristic curve, wow exceeding 1% was generated at vibration of 40 Hz and also at 100 Hz or more. These characteristics were measured in another way, that is, in an auditory sense compensation, and the results were as shown in FIG. 2. The wow generated at the vibration of 100 Hz or more was less than 0.2% and caused no problem, but the wow generated at about 40 Hz was still more than 0.2%, which caused the quality of sound to be degraded.

Detailed analyses of the wow at 40 Hz were then made, which can be understood with reference to the structures of a conventional tape recorder and the tape cassette and operations thereof as will be explained in detail with reference to FIGS. 3 through 8.

Referring first to FIGS. 3 and 4, a tape cassette case generally designated by reference numeral 1 is made up of cassette halves 1a and 1b and a tape 2 encased therein. The tape 2 is fixed at either end to a pair of reels 3a and 3b by means of respective clampers 4a and 4b, so that the tape can be wound onto the reels 3a and 3b. Thus, when the winding diameter of tape on one side is increased, the winding diameter of tape on the other side is decreased. In the drawings, the tape is fully wound on supply reel 3b. It is a typical feature of the tape cassette that no flanges are provided on the reels 3a and 3b, to thereby decrease the distance between reels 3a and 3b, which in turn leads to a miniaturization of the overall physical cassette size. However, without flange members, the tape may be wound on the reels 3a and 3b non-uniformly in a width wise direction. In order to eliminate this defect, i.e., to prevent the tape from contacting with the inner walls of the cassette halves 1a and 1b, and in order to achieve such prevention without causing any substantial additional friction, a space is provided between the tape and each inner wall of the cassette halves 1a and 1b, and a sheet 5a or 5b which is a so called "retainer" is interposed in this space so that the reels 3a and 3b are retained at a suitable position within the case 1.

A pair of guide rollers 6a and 6b, a pressure pad 7, and the like are encased in the case together with the tape 2 and the reels 3a and 3b. In the walls of the case 1 are formed a pair of capstan shaft insertion holes 8a and 8b, positioning pin insertion holes 9a, 9b, 9c and 9d, a pair of pinch roller insertion holes 10a and 10b, reel shaft insertion holes 11a and 11b, and a magnetic head insertion hole 12. Reference characters 3a' and 3b' denote engagement lips formed at an angular interval of 60° on the circumferential periphery of the reel 3a or 3b.

On the other hand, the cassette tape recorder comprises a pair of reel shafts 20a and 20b, a capstan shaft 21, a pinch roller 23 and a magnetic head 24. When the tape cassette 1 is mounted on the tape recorder, the reel shafts 20a and 20b are inserted through the reel shaft insertion holes 11a and 11b into the interior of the tape cassette 1 and engage with the reels 3a and 3b. At the same time, the capstan shaft 21 is inserted into the capstan shaft insertion hole 8a. Then, when the tape recorder is played, the pinch roller 23 is inserted through the pinch roller insertion hole 10a into the interior of the tape cassette 1 to clamp the tape 2 against the capstan shaft 21 so that the pinch roller cooperates with the capstan shaft 21 rotating at a constant speed to move the tape 2 at a constant speed. At the same time, the magnetic head 24 is inserted through the magnetic head insertion hole 12 into the interior of the cassette case 1 to clamp the tape 2 against the pressure pad 7 to thereby reproduce the information recorded on the tape 2.

In the thus described play condition, the reel shaft 20a serves to take up the tape 2 and is driven by a drive source (not shown), whereas the reel shaft 20b serves to feed the tape 2 and is not driven by the source, but instead the reel shaft 20b is adapted to apply a constant back tension to the tape 2.

The reel shaft 20b on the supply side of conventional construction is shown in FIGS. 5 and 6, wherein the character C denotes a chassis of the cassette tape recorder, from which an upright shaft $20b_1$ extends vertically. A reel shaft member $20b_2$ having a regular hexagonal cross section is freely rotatably mounted on the upright shaft $20b_1$. A cylindrical hub $20b_3$ surrounds the shaft $20b_2$ so as to be slidable in the axial direction but to positively engage with the shaft member $20b_2$ with respect to the horizontal or rotational direction. The cylindrical hub $20b_3$ is biased to move in one direction by a spring $20b_4$ interposed between the bottom surface of the hub and the facing portion of the shaft member $20b_2$. The hub $20b_3$ is held at a position shown by a retaining member $20b_5$ tightly engaged with the shaft member $20b_2$.

As described above, the shaft member $20b_2$, the cylindrical hub $20b_3$, the spring $20b_4$ and the retaining member $20b_5$ are formed in a unit which is prevented from being pulled apart from the upright shaft $20b_1$ by means of a stopping member $20b_6$ mounted on the top end of the upright shaft $20b_1$, as shown in FIG. 5. A leaf spring $20b_7$ interposed between a flanged portion of the upright shaft $20b_1$ and the shaft member $20b_2$ is provided in order to produce a constant frictional force between the reel shaft unit and the upright shaft $20b_1$ to thereby apply a back tension to the tape 2. With the thus constructed reel shaft 20b, when the tape cassette is inserted, if the reel lips 3b' of the cassette are not properly meshed with the outer projections $20b'_3$ of the cylindrical hub $20b_3$, the cylindrical hub $20b_3$ may be pressed downwardly so that no damage occurs. If a simpler construction is desired, as shown in FIG. 7, projections $20b'_2$ may be formed directly on the shaft member $20b_2$ with the shaft member rotatably mounted on the upright shaft $20b_1$. The leaf spring $20b_7$ provides back tension and is also provided with somewhat more bending range.

Now, when the above-described tape recorder is in the play condition, let us assume that an up-and-down vibration is applied thereto as shown by the arrow in FIG. 4. When the frequency of vibration is very low, e.g. about 1 Hz, the reels 3a and 3b are vibrated together with the case 1 and chassis C. However, when the frequency is increased, the reels 3a and 3b may remain relatively stationary while only the case 1 vibrates vertically together with the chassis C. For this reason, the upper and lower inner walls of the case 1 collide against the reels 3a and 3b with high energy. In such a condition, the tape 2 may be elongated or shortened between the point a on the tape 2 clamped between the capstan shaft 21 and the pinch roller 23 and the point b at the winding end of the reel 3b.

It is to be noted that the tape 2 between the above described points a and b has a resonance at a resonance frequency $f_O$ which is determined according to the spring constant of the tape 2 and the inertial moment of the tape wound on the reel 3b. Now, when the value of $f_O$ is calculated with a typical back tension of 2 to 3 g, a value of $f_O=30-40$ Hz, is derived.

When the cassette tape recorder is in its play condition, as shown in FIG. 8a, the projections 3b' of the supply reel 3b are engaged with the projections 20b'$_3$ of the reel shaft 20b so that the projections 3b' rotate the reel shaft 20b while the supply reel is rotated in the direction of the arrow. However, when the above noted resonance is generated, the rotation of the reel 3b may be stopped by the elongation of the tape 2 as shown in FIG. 8b. Thereafter, due to the reduction of the tape, the reel 3b is rapidly rotated to thereby rotate the reel shaft 20b with high energy and at a higher speed as shown in FIG. 8c. For this reason, a reactive force occurs whereby the shaft projections 20b'$_3$ push back on the reel projections 3b' so that, with the next elongation of the tape 2, the projections 3b' and 20b'$_3$ of both members are separated from each other as shown in FIG. 8d. Once such a state is generated, collision and reaction are alternately generated between the projections 3b' and 20b'$_3$ to thereby cause a so-called jitter. As a result, the travelling speed of the tape 2 on the surface of the magnetic head 24 is changed, which causes wow to be generated at about 40 Hz.

SUMMARY OF THE INVENTION

Accordingly, it is an object of this invention to provide a reel shaft unit which is substantially immune from tape resonance caused by vertical vibration of the tape machine.

Briefly, this is achieved according to the present invetion by a reel shaft unit in which a resilient support is provided immediately below the projections of the hub member for resiliently supporting the tape reel. The supporting force of the resilient support is designed to support the weight of a fully wound reel at a substantially intermediate portion of the cassette. The resilient support thus acts as a kind of shock absorber to minimize contact with the cassette case during vertical vibrations. Further, the resilient support is preferably a frictional member which hinders the sliding movement of the reel engagement projections away from the hub projections. The resilient support may be either separately provided or may be integral with the hub itself.

BRIEF DESCRIPTION OF THE DRAWINGS

The invention will be more fully understood from the following description in conjunction with the accompanying drawings, in which:

FIG. 1 is a graph showing the wow characteristics of a prior art cassette tape recorder, before auditory compensation;

FIG. 2 is a graph showing the wow characteristics of the same cassette tape recorder as in FIG. 1, after auditory compensation;

DETAILED DESCRIPTION OF THE INVENTION

Figure 3:
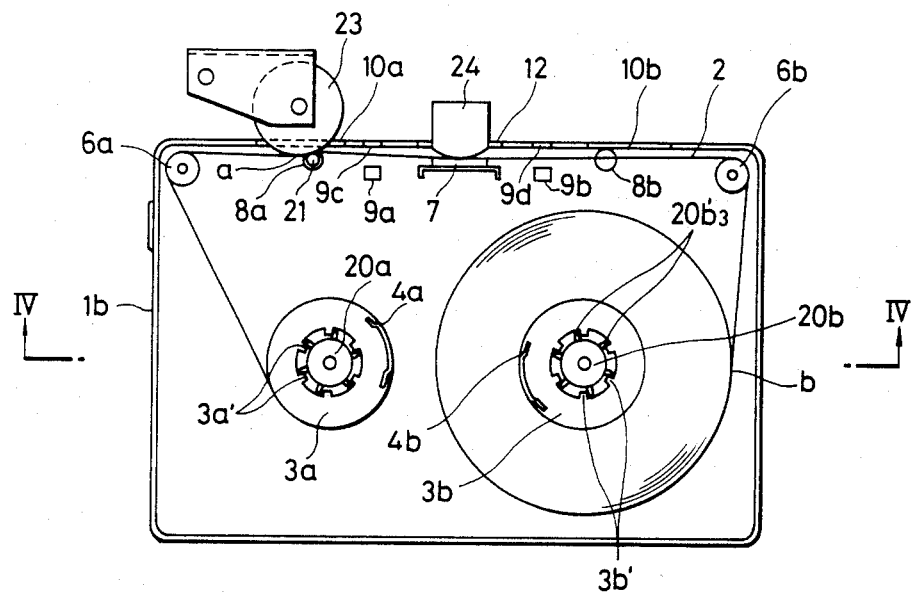
FIG. 3 is a plan view showing a prior art cassette from which an upper half has been removed, together with the essential components of a recorder, as tested for the graphs in FIGS. 1 and 2.
Figure 4:
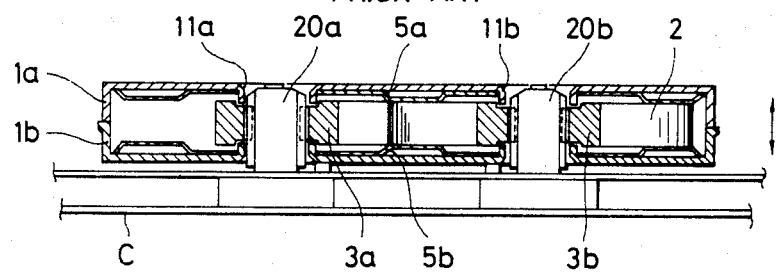
FIG. 4 is a cross sectional view of the cassette tape and recorder taken along line IV—IV of FIG. 3.
Figure 5:
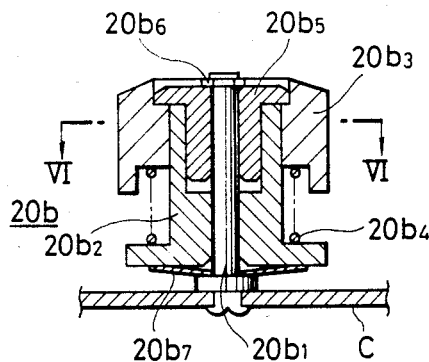
FIG. 5 is a cross sectional view showing a conventional tape supply reel shaft.
Figure 6:
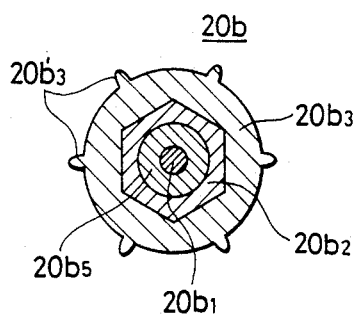
FIG. 6 is a cross sectional view of the reel shaft taken along the line VI—VI of FIG. 5.
Figure 7:
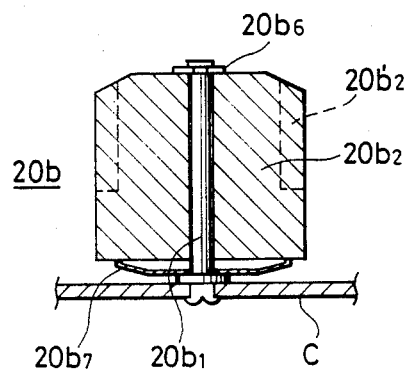
FIG. 7 is a cross sectional view showing another conventional tape supply reel shaft.

One embodiment of the present invention will now be described with reference to FIGS. 9 to 18 in which the same reference characters are used to designate like components and members shown in FIGS. 3 to 8.

Figure 9:
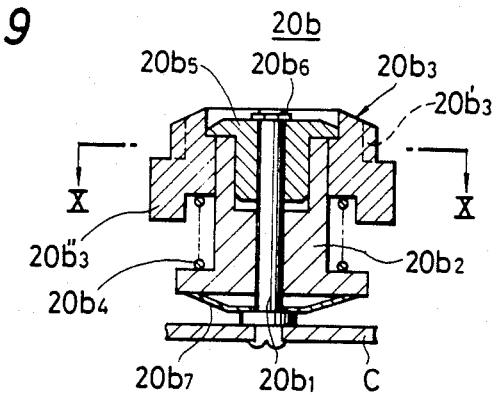
FIG. 9 is a cross sectional view of a reel shaft portion of a cassette recorder according to a first embodiment of this invention.
Figure 10:
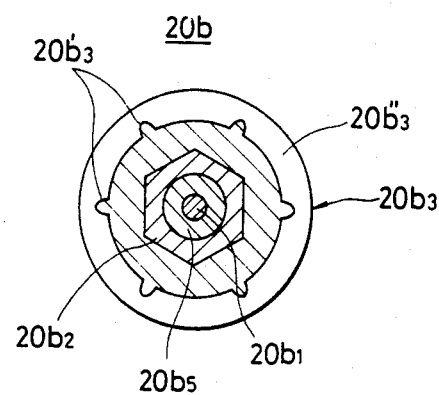
FIG. 10 is a plan sectional view taken along line X—X of FIG. 9.
Figure 11:
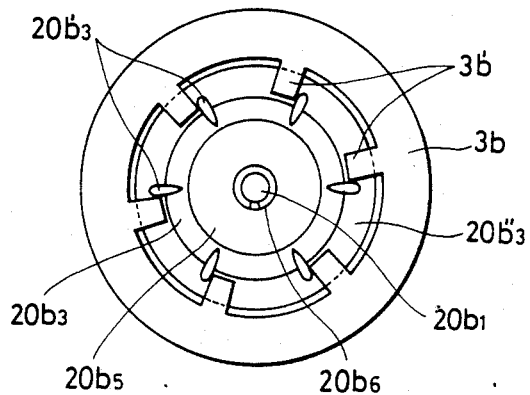
FIG. 11 is an illustrative plan view of the shaft unit of FIG. 9 in cooperation with a cassette reel.
Figure 12:
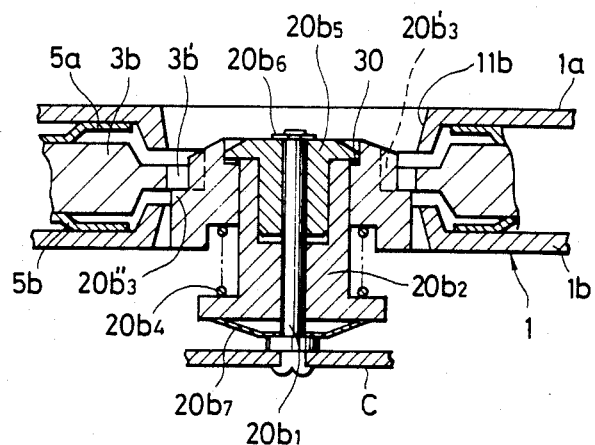
FIG. 12 is a side sectional view illustrating the operation of the shaft portion of FIG. 9 with a tape cassette.

FIGS. 9 to 11 show a reel shaft unit $20b$ on the tape supply side of a one way type cassette tape recorder. In the reel shaft unit $20b$ shown in FIGS. 9 to 11, a flange $20b''_3$ on which engagement projections $3b'$ of the cassette reel $3b$ are to be laid is formed integrally with lower portions of projections $20b'_3$ of a cylindrical hub $20b_3$. A mounted cassette is supported horizontally through the cylindrical hub $20b_3$ by a spring $20b_4$. The cassette reel $3b$ is held at an intermediate position between the upper and lower halves in the cassette. Except for such a novel construction, the reel shaft unit according to the present invention is constructed in a well known manner. However, it is to be noted that the elastic force of the spring $20b_4$ according to the present invention is selected to a range of 10 to 20 g so that the weight of the tape fully wound on the reel $3b$ may be substantially balanced with spring force. Therefore, in the cassette mounting condition, as shown in FIG. 12, the upper surface of the cylindrical hub $20b_3$ is slightly separated from the retaining member $20b_5$ so that an air gap 30 may be formed between the cylindrical hub $20b_3$ and the retaining member $20b_5$.

In the described embodiment, although the elasticity of the spring $20b_4$ is selected to a specific value, it is possible to use a conventional spring having a high rigidity as the spring $20b_4$ and to in turn use a leaf spring $20b_7$ satisfying the above described condition. In this case, when the cassette is mounted on the reel shaft, the entire reel shaft unit is lowered so that an air gap is formed between the stopping member $20b_6$ and the retaining member $20b_5$.

Figure 8:
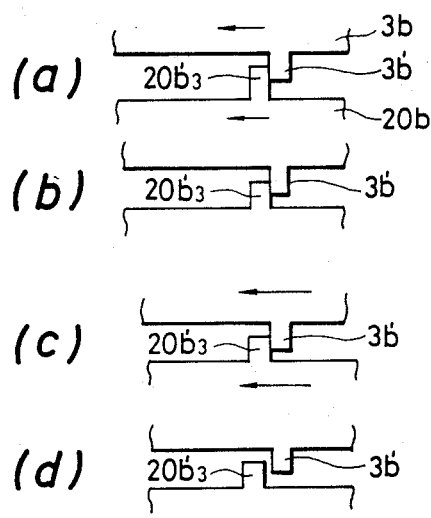
FIGS. 8a to 8d illustrate a resonance problem caused in the conventional tape supply reel shaft.

In any case, since the reel $3b$ of the cassette is supported vertically by the spring $20b_4$ or the leaf spring $20b_7$, even if the vertical vibration is applied to the tape recorder, the reel $3b$ is prevented from colliding against a lower inner wall of the cassette case 1 so that the up-and-down movement may be reduced remarkably. For this reason, resonance of the tape 2 in the cassette case is weakened and the collision or reaction between the projections $3b'$ of the reel $3b$ and the projections $20b'_3$ of the cylindrical hub $20b_3$ is substantially dampened. In other words, a jitter as shown in FIG. 8 may be substantially avoided while the travelling speed of the tape 2 on the magnetic head 24 is maintained constant to thereby improve the wow characteristics.

Figure 13:
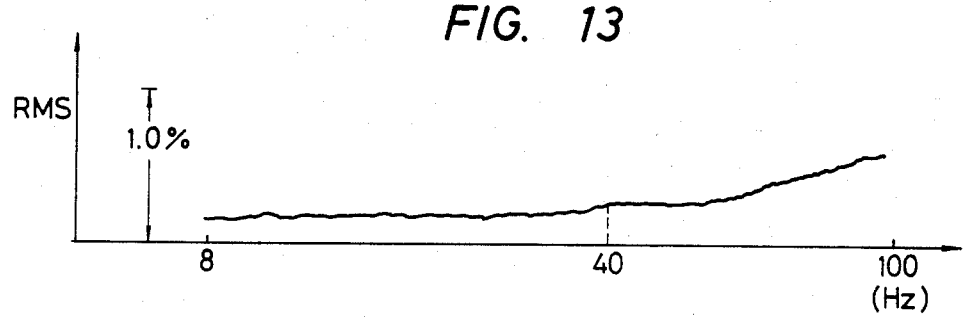
FIGS. 13 and 14 are graphs corresponding to FIGS. 1 and 2 and illustrating the wow characteristics in a cassette recorder employing the first embodiment of this invention.
Figure 14:
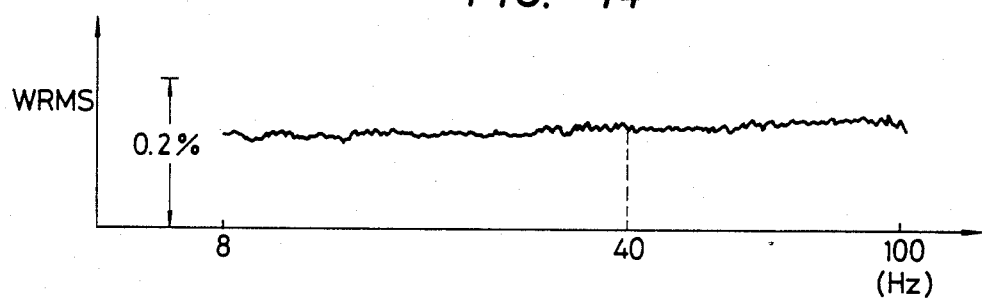

The degrees of improvement according to the present invention are shown in FIGS. 13 and 14. From these Figs. it can be seen that wow above 1% and 0.2% before and after the auditory compensation, respectively, is eliminated.

Figure 15:
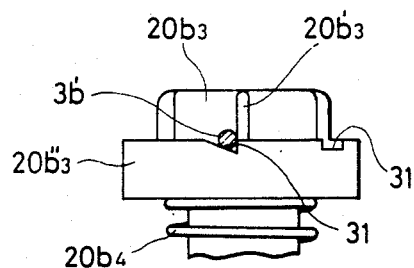
FIG. 15 is a side view illustrating modification to the flange member of FIG. 9.

FIG. 15 shows a modification of the reel shaft unit according to the present invention which may be preferable. A plurality of concave portions 31 each having a slant surface on one side are formed in the flange $20b''_3$ in the vicinity of the projections $20b'_3$ of the cylindrical hub $20b_3$. The engagement projections $3b'$ of the reel are engaged with the concave portions 31 to thereby make it difficult to cause a displacement between the reel $3b$ and the cylindrical hub $20b_3$ in the rotational direction. Thus, even if resonance occurs in the tape 2, the reel projection $3b'$ is prevented from separating from the projection $20b''_3$ of the cylindrical hub $20b_3$.

Figure 17:
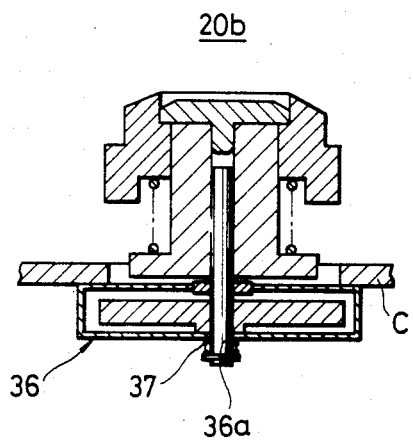
FIGS. 16 and 17 are sectional views illustrating modifications of the embodiment of FIG. 9 for use with a bidirectional tape recorder.
Figure 16:
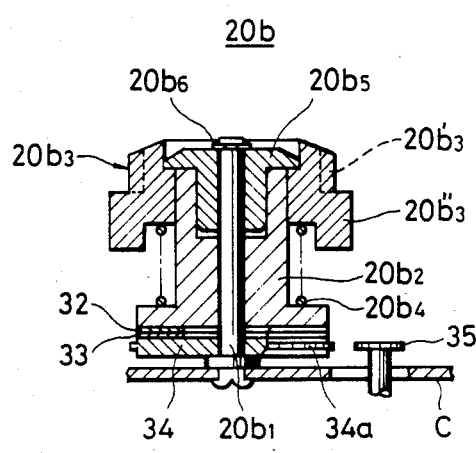
Figure 18:
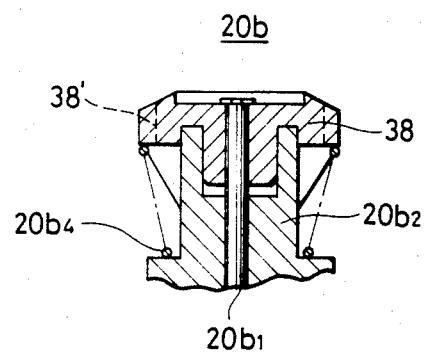
FIG. 18 is a sectional view of a further variation of the first embodiment of this invention.
Figure 19:
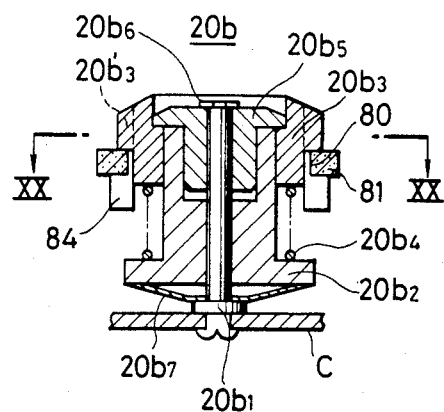
FIG. 19 is a sectional view of a reel shaft portion of a cassette recorder according to a second embodiment of this invention.
Figure 20:
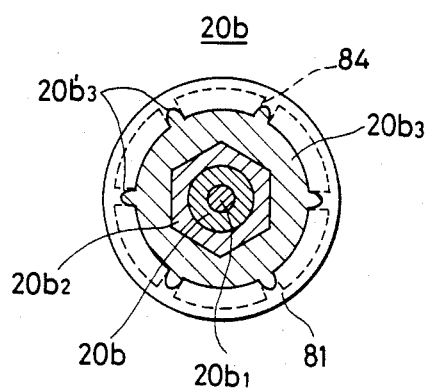
FIG. 20 is a plan sectional view taken along line XX—XX of FIG. 19.
Figure 21:
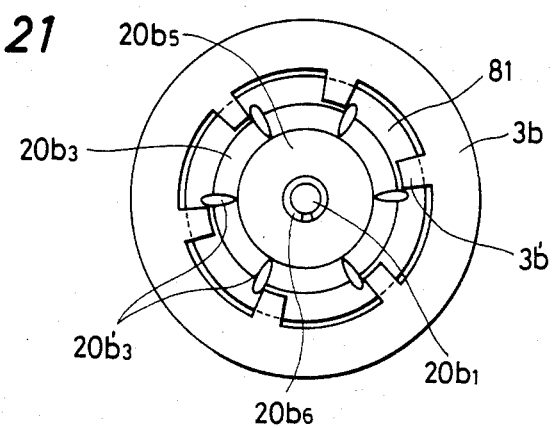
FIG. 21 is a plan illustrative view of the shaft portion of FIG. 19 in cooperation with a cassette reel.

FIGS. 16 and 17 show reel shaft units used with a bidirectional tape recorder in which play can be achieved in either tape travelling direction. The reel shaft units are used not only on the tape supply side but also on the take-up side, thereby requiring some additional structure. More specifically, in the embodiment shown in FIG. 16, a pulley 34 is coupled to shaft member $20b_2$ through a friction mechanism composed of felts 32 and 33 which are pressed to each other by spring $20b_4$. A gear 35 which is rotated by a drive source (not shown) is selectively engaged with a gear 34a formed on the circumference of the pulley 34.

In the embodiment shown in FIG. 17, a flat motor 36 which is driven when used on the tape take-up side fixed to the chassis C and a reel shaft unit is fixed to a rotary shaft 36a of the motor 36. In this case, when the reel shaft unit $20b$ is used for the tape supply reel, the motor is not driven. A spring 37 mounted on the lower end of the rotary shaft 36a is used to impart a friction to cause a back tension in the tape 2.

In any of the preceding embodiments of the present invention, the cylindrical hub $20b_3$ is slidable in the axial direction of the shaft member $20b_2$. However, such a reel unit construction is not necessary to achieve the essential purpose of this invention. Therefore, in FIG. 18, a member 38 which integrally includes the retaining member and the cylindrical hub is mounted on the shaft member $20b_2$, and projections $38'$ which engage with the projections $2b'$ of the reel $3b$ are formed on the member 38. A spring $20b_4$ is interposed between the above described projections $38'$ and the shaft member $20b_2$. When the cassette is employed, the projections $3b'$ of the reel $3b$ are supported by the spring $20b_4$. It is preferable that a recess or the like be formed in the member 38 in order to prevent a displacement of the spring relative to the member 38.

FIGS. 19 to 22 show a reel shaft unit $20b$ on the tape supply side of a one way type cassette tape recorder according to another aspect of the present invention. In the reel shaft unit $20b$ shown in FIGS. 19 to 21, an annular engagement groove 80 is formed on the underside of the projections $20b'_3$ of the cylindrical hub $20b_3$ along the circumference of the cylindrical hub $20b_3$. An annular frictional member 81 made of foamed material such as neoprene sponge or the like is provided around the annular groove 80. However, it should be noted that the projections $3b'$ of the reel $3b$ of the mounted cassette are laid on the friction member 81, and the reel $3b$ is supported upwardly through the cylindrical hub $20b_3$ under the force of spring $20b_4$, so that the reel $3b$ may be held at an intermediate position between the upper and lower cassette halves in the cassette case 1. Also, the elastic force of the spring $20b_4$ is selected to be in a range of 10 to 20 g so that it is substantially balanced with the weight of the tape fully wound on the reel 3b.

Figure 22:
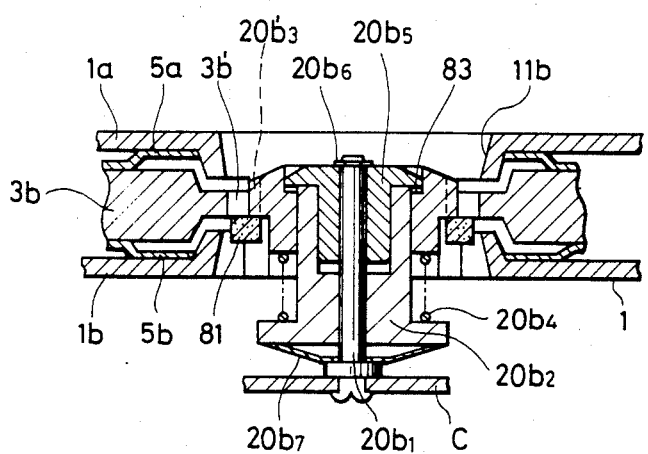
FIG. 22 is a sectional view illustrating the shaft unit of FIG. 19 in cooperation with a tape cassette.

With this construction, as shown in FIG. 22, the upper surface of the cylindrical hub $20b_3$ is slightly separated from the retaining member $20b_5$ so that an air gap 83 is formed therebetween. Reference numeral 84 denotes slits which are formed as a result of the configuration of a molding die. As previously described, it is possible to use a conventional spring $20b_4$ having a high rigidity and to in turn use a leaf spring $20b_7$ meeting the above noted condition. In this case also, the entire reel shaft unit would be lowered so that a gap is formed between the stopping means $20b_6$ and the retaining member $20b_5$.

Figure 23:
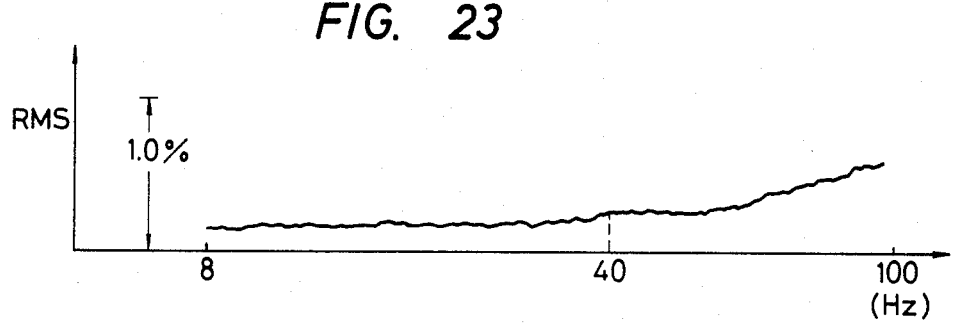
FIGS. 23 and 24 are graphs corresponding to FIGS. 1 and 2 illustrating the wow characteristics in a cassette recorder employing the embodiment of FIG. 19.
Figure 24:
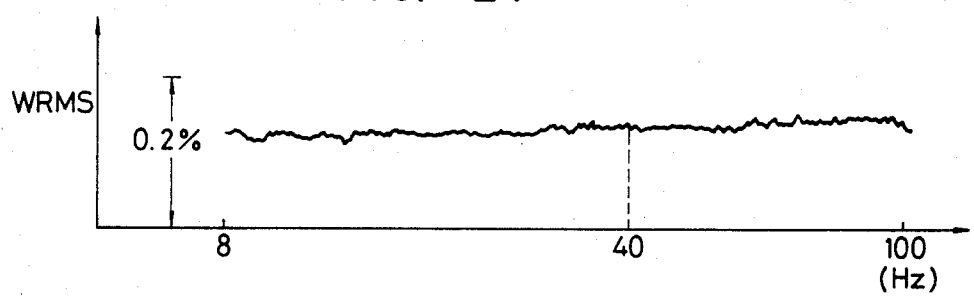

The results showing an improvement in wow characteristics of the reel shaft unit of FIGS. 19 to 22 are shown in FIGS. 23 and 24 which respectively indicate measurements before and after the auditory compensation. Wow exceeding 1% and 0.2% was completely eliminated.

Figure 25:
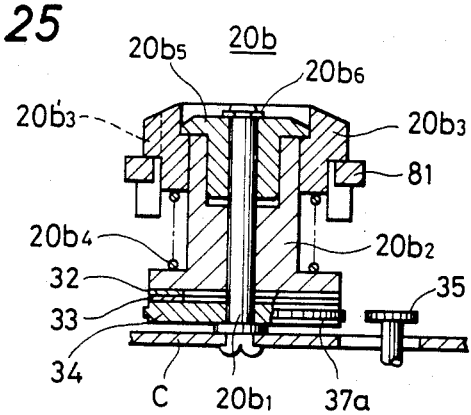
FIGS. 25 and 26 are sectional views of variations of the embodiment of the FIG. 19 for use in a bidirectional tape recorder.
Figure 26:
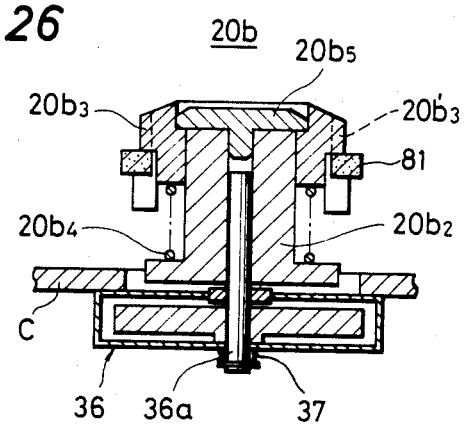

FIGS. 25 and 26 show other reel shaft units according to the present invention similar to the embodiment shown in FIGS. 19 to 22. The units shown in FIGS. 25 and 26 are for bidirectional tape recorders and therefore require additional structure. In FIG. 25, a pulley 34 is coupled to a shaft member $20b_2$ through a friction mechanism composed of felts 32 and 33 pressingly contacted to each other by a spring $20b_4$ and a gear 35 which is driven by a drive source (not shown) is engaged with a gear 34a formed on the circumference of the pulley 34.

FIG. 26 shows another modification of the present invention in which, in the same manner as described above, a flat motor 36 which is driven when the reel shaft unit 20b is used as the tape take-up side is fixed to the chassis C, and the reel shaft unit is fixed to the rotary shaft 36a of the motor 36. In this case, when the reel shaft unit 20b is used as the tape supply side, the motor 36 is not driven, and a spring 37 is mounted on the lower end of the rotary shaft 36a to impart a back tension to the tape 2.

Figure 27:
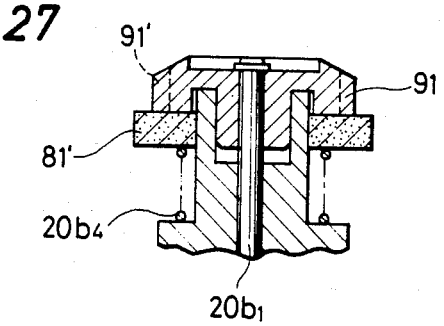
FIG. 27 is a sectional view of a further variation of the embodiment of FIG. 19.
Figure 28:
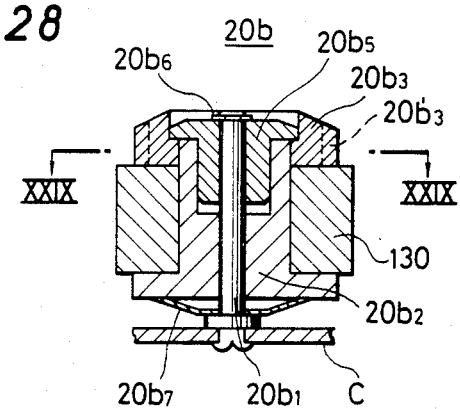
FIG. 28 is a sectional view of a reel shaft portion of a cassette tape recorder according to a third embodiment of this invention.
Figure 29:
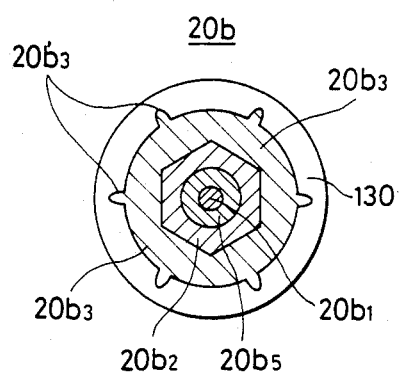
FIG. 29 is a plan sectional view taken along line XXIX—XXIX of FIG. 28.
Figure 30:
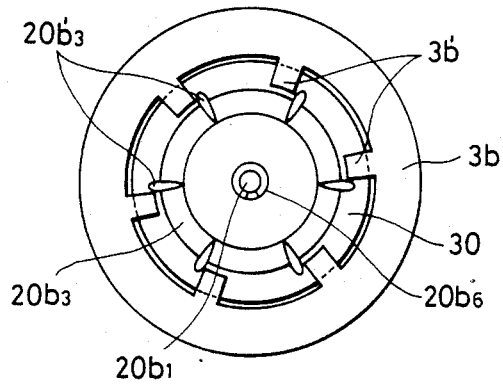
FIG. 30 is a plan illustrative view of the shaft portion of FIG. 28 in cooperation with a cassette reel.
Figure 31:
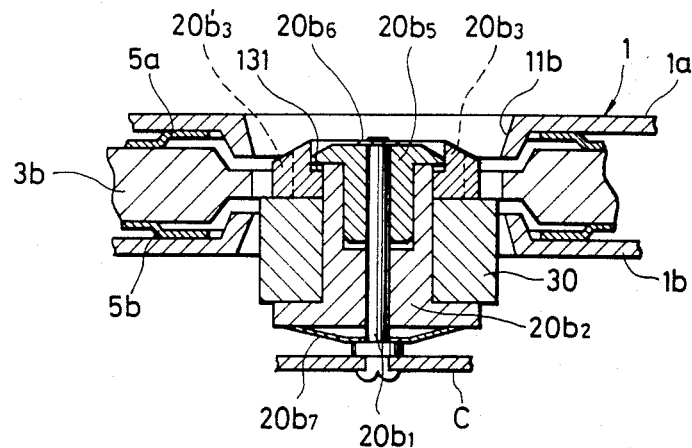
FIG. 31 is a sectional view illustrating the shaft portion of FIG. 28 in cooperation with a tape cassette.

FIG. 27 shows a tape reel shaft unit without the unnecessary structure for sliding the cylindrical hub $20b_3$ in the axial direction of the shaft body $20b_2$. In FIG. 27, a member 91 composed of the retaining member and the cylindrical hub is provided with projections 91' which engage with the projections of the reel 36. A frictional member 81' is held between the member 91 and the shaft member $20b_2$ through a spring $20b_4$. The hub member 91 has an annular recess on its lower side for receiving a mating shoulder at the upper portion of shaft member $20b_2$, so that the hub member 91 is not vertically movable but only the ring member 81' will yield to the weight of the reel 3b.

FIGS. 28 to 31 show still another tape reel shaft unit according to the present invention, in which the same reference characters are used to designate like members and like components dicussed in reference to the aforesaid embodiments. FIGS. 28 to 31 show the unit for a one way type tape recorder. In FIGS. 28 to 31, a viscous elastic member 130 made of frictional elastic material such as neoprene sponge or the like is used instead of the spring $20b_4$ used in the prior art. Except for this feature, the unit according to the present invention can be made in substantially the same manner as in the prior art of FIGS. 3 to 8. It is, however, to be noted that the reel 3b of the mounted cassette is laid on the viscous elastic member 130 and in frictional contact with the member 130. The reel is supported upwardly by the elastic member 130 so that the reel may be held at an intermediate position between the upper and lower halves of the cassette case. Also, the elastic force of the elastic member 130 is selected to a range of 10 to 20 g so that it may be balanced with the weight of the tape fully wound on the reel 3b. In the same manner as described above and as shown in FIG. 31, when a cassette is mounted, a gap 131 is formed between the cylindrical hub $20b_3$ and the retaining member $20b_5$.

Figure 32:
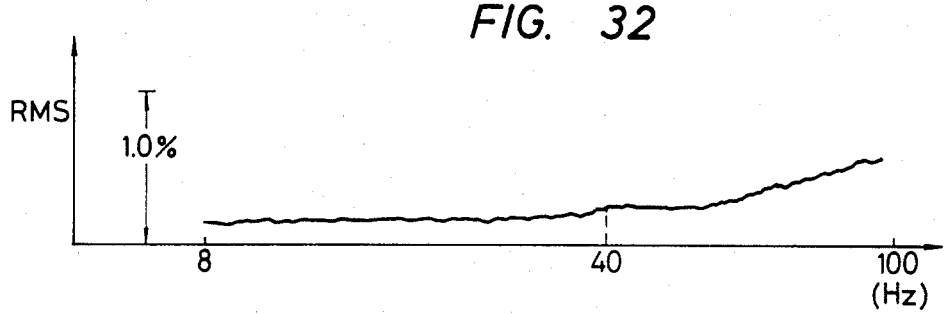
FIGS. 32 and 33 are graphs corresponding to FIGS. 1 and 2 illustrating the wow characteristics in a cassette recorder employing the shaft unit of FIG. 28.
Figure 33:
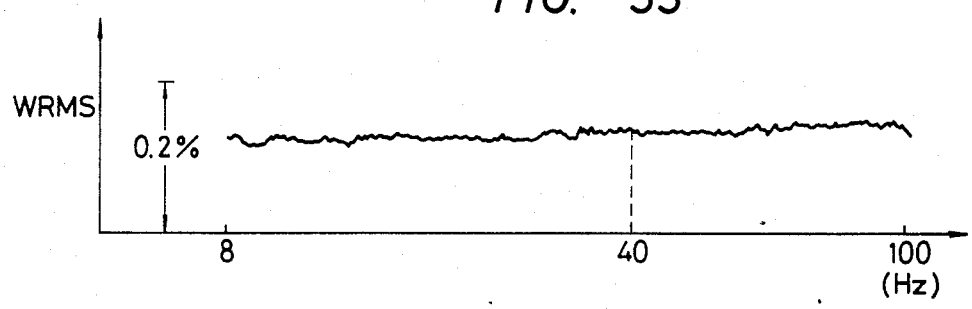

The improvement in wow characteristics of the embodiment shown in FIGS. 28 to 31 are shown in FIGS. 32 and 33. FIGS. 32 and 33 are graphs showing the wow characteristics measured before and after auditory compensation, respectively. In the experiments, wow exceeding 1% and 0.2% before and after the auditory compensation, respectively, was completely eliminated.

Figure 34:
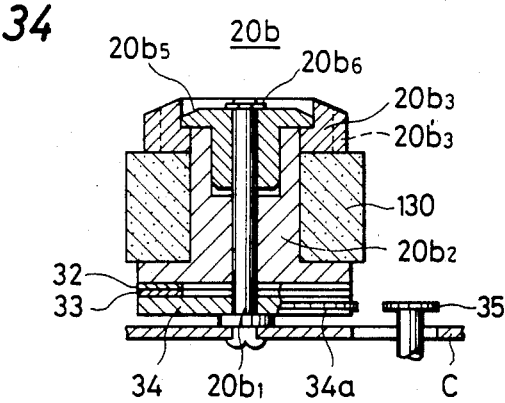
FIGS. 34 and 35 are sectional views of variations of the embodiment of FIG. 28 for use with a bidirectional tape recorder.
Figure 35:
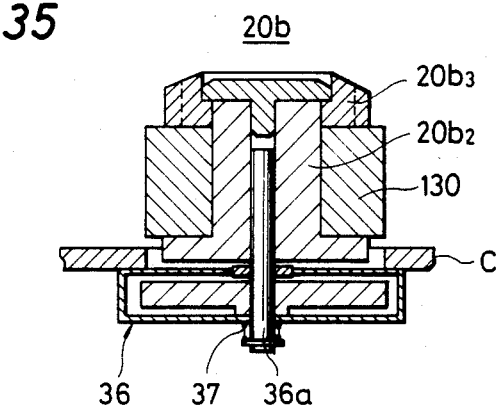

FIGS. 34 and 35 show other modifications to the embodiment shown in FIGS. 28 to 31. The units shown in FIGS. 34 and 35 are for bidirectional tape recorders. In FIG. 34, a pulley 34 is coupled to a shaft member $20b_2$ through a friction mechanism composed of felts 32 and 33 coupled to each other by the viscous elastic member 130, and a gear 35 which is rotated by a drive source (not shown) is engaged with a gear 34a formed on the circumference of the pulley 34.

In FIG. 35, a flat motor 36 rotated when the reel shaft unit 20b is used for a tape take-up reel is fixed to the chassis C, and the reel shaft unit is fixed to a rotary shaft 36a of the motor 36. Also, the motor 36 is not driven when the reel shaft is used for the tape supply side. A spring 37 is adapted to impart a back tension to the tape 2.

Figure 36:
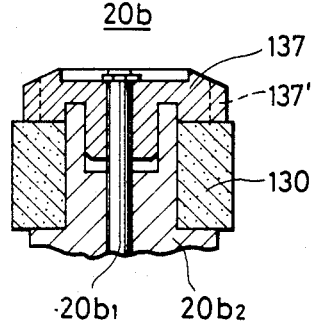
FIG. 36 is a sectional view of a further variation of the embodiment of FIG. 28.

In FIG. 36, a member 137 is composed of the retaining member and the hub member. Engagement projections 137' are formed on the outer periphery of the member 137 for the same purpose as described above, and the reel 3b will be resiliently and frictionally supported by the member 130.

In each of the above-described embodiments, a frictional member supports the supply reel with a force that substantially balances the reel at a position intermediate the upper and lower halves of the cassette. Further, the frictional engagement of the engagement projections 3b' of the cassette reel will make it difficult for the projections to slide along the surface of the friction member away from the projections $20b'_3$. Thus, the separation explained with reference to FIGS. 8a–8d is much less likely to occur.

What is claimed is:

1. In a cassette tape machine of the type having a rotatable shaft unit having projections thereon for engaging projections on a cassette reel to be rotated by said cassette reel when the latter rotates in a tape supply direction, the improvement comprising resilient support means disposed on said shaft unit immediately below said shaft unit projections for resiliently supporting said reel projections, said resilient support means comprising a foamed material such as neoprene sponge or the like.

2. A cassette tape machine as claimed in claim 1, wherein said shaft unit includes elastic means for urging said support means upwardly with an elastic force and retaining means for preventing the upward movement of said support means above a predetermined position and said elastic force is such that said support means is positioned below said predetermined position when said support means is supporting a fully wound cassette reel.

3. A cassette tape machine as claimed in claim 1, wherein said elastic force is between 10 grams and 20 grams.

4. A cassette tape machine as claimed in claim 1, wherein said shaft unit includes a hub having said projections thereon, a shaft member about which said hub is mounted and with respect to which said hub is axially movable, and a spring member urging said hub axially with respect to said shaft member, said resilient support means comprising a flange portion formed on said hub immediately below said shaft unit projections.

5. A cassette tape machine as claimed in claim 1, wherein said shaft unit includes a hub member having said shaft unit projections thereon, a shaft member about which said hub is mounted and an elastic member contacting a lower surface of said hub for urging said hub member axially upwardly with respect to said shaft member, said resilient support means comprising said elastic member directly contacting said reel projections.

6. A cassette tape machine as claimed in claim 5, wherein said elastic member further comprises a coil spring.

7. A cassette tape machine as claimed in claim 5, wherein said elastic member comprises a viscous elastic material.

8. A cassette tape machine as claimed in claim 5, wherein said flange portion is an annular member mounted in a groove cut in said hub.

9. A cassette tape machine as claimed in claim 1, wherein said shaft unit comprises a hub mounted on a shaft member and having said shaft unit projections thereon and a spring member for urging said hub axially upwardly with respect to said shaft member, and said resilient support means is an annular member surrounding said shaft member immediately below said hub and between said hub and spring member.

10. A cassette tape machine as claimed in claim 5, wherein said hub member is axially movably mounted with respect to said shaft member.

11. A cassette tape machine as claimed in claim 1, wherein said resilient support means includes a spring exerting an upward force on said cassette reel projections which force is substantially equal to the weight of a fully wound cassette reel.

12. A cassette tape machine as claimed in claim 1, wherein said resilient support means supports said reel projections with an elastic force sufficient to support a fully wound reel at an intermediate position between top and bottom halves of said cassette.

13. A cassette tape machine as claimed in claim 1, wherein said foamed material comprises neoprene sponge.

* * * * *